No. 712,261. Patented Oct. 28, 1902.

C. A. CLARK & A. WHEELER.
WHIFFLETREE HOOK.
(Application filed Mar. 14, 1902.)

(No Model.)

Witnesses:
F. L. Ourand
Frank G. Radlfinger

Inventors:
Charles A. Clark and
Arthur Wheeler,
By Louis Bagger & Co.,
Attorneys.

UNITED STATES PATENT OFFICE.

CHARLES A. CLARK AND ARTHUR WHEELER, OF FLINT, MICHIGAN, ASSIGNORS, BY MESNE ASSIGNMENTS, TO JOHN M. HART, OF FLINT, MICHIGAN.

WHIFFLETREE-HOOK.

SPECIFICATION forming part of Letters Patent No. 712,261, dated October 28, 1902.

Application filed March 14, 1902. Serial No. 98,176. (No model.)

*To all whom it may concern:*

Be it known that we, CHARLES A. CLARK and ARTHUR WHEELER, citizens of the United States, residing at Flint, in the county of Genesee and State of Michigan, have invented new and useful Improvements in Whiffletree-Hooks, of which the following is a specification.

Our invention relates to improvements in whiffletree-hooks; and the object of the same is to construct a spring-actuated device of this character which will positively hold a tug against slipping off.

The simple and novel construction used by us in carrying out our invention is fully described in this specification and claimed, and illustrated in the accompanying drawings, forming a part thereof, in which—

Figure 1:
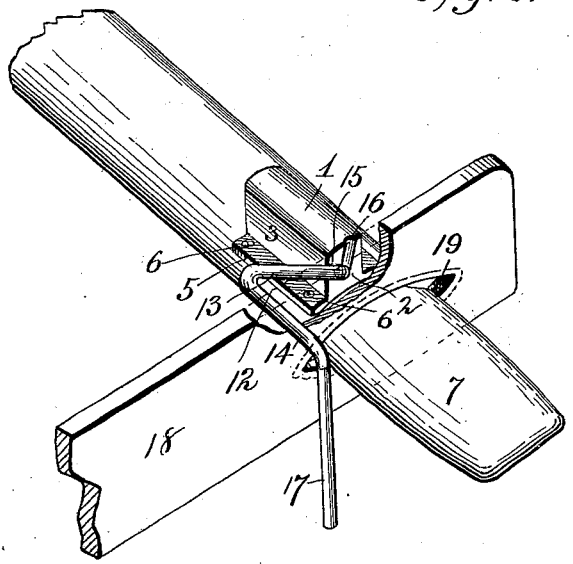
Figure 2:
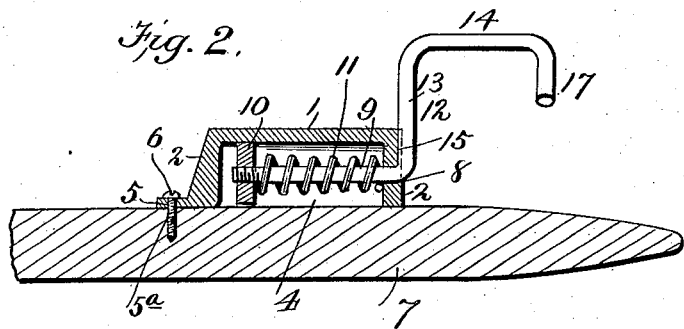
Figure 3:
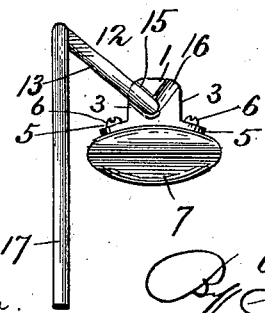

Figure 1 is a perspective of a fragment of a whiffletree equipped with our device. Fig. 2 is a vertical longitudinal section of our device. Fig. 3 is an end elevation of the same.

The numeral 1 designates a housing, which has closed ends 2 and sides 3. The housing 1 is rectangular in cross-section, is open at the bottom 4, and is provided with a flange 5, provided with apertures 5ª to accommodate screws 6 for securing it to a whiffletree 7. One of the ends 2 is pierced by an aperture 8, in which a shaft 9 is journaled, which shaft extends the length of the housing 1 and bears on its inner end, which is threaded, an angular nut 10, which fits snugly the housing. A stiff spiral spring 11 surrounds the shaft 9 and bears at one end on the nut 10 and at the other end on the apertured end 2 of the housing. The outer end of the shaft 9 bears a crank 12, comprising arms 13 and 14, respectively perpendicular and parallel to the shaft 9. Two notches 15 and 16 are formed in the apertured end 2 of the casing. Notches are located to be engaged by the arm 13. The arm 14 bears a longer guard-arm 17, which extends at right angles thereto and is located to come almost in contact with the side of the whiffletree when the arm 13 engages the notch 15 and to clear the whiffletree when the arm 13 is engaging the notch 16.

In operation the arm 13 is turned up in position to engage the notch 16, and a tug 18, provided with an eye 19, is slipped over the end of the whiffletree 7. The radial arm 13 is then turned down to engage the notch 15, which will bring the guard-arm 17 in contact with the whiffletree 7 and prevent the slipping off of the tug.

We do not wish to be limited as to details of construction, as these may be modified in many particulars without departing from the spirit of our invention.

Having thus described our invention, what we claim as new, and desire to secure by Letters Patent, is—

In a whiffletree-hook, the combination with a housing constructed to be secured to a whiffletree, of a shaft mounted in said housing and bearing a nut on its inner end, a spiral spring surrounding said shaft and bearing on said housing and said nut, said shaft having a crank thereon, the radial arm of which is located to engage notches in the housing to lock it in position, and a guard-arm carried by said crank and located to prevent the slipping off of the whiffletree, substantially as described.

In testimony whereof we have hereunto set our hands in presence of two subscribing witnesses.

CHARLES A. CLARK.
ARTHUR WHEELER.

Witnesses:
FREDRIC D. CRANE,
WM. W. JENNINGS.